United States Patent
Ichiba et al.

[11] 3,935,375
[45] Jan. 27, 1976

[54] LAMINATE TAPE AND LAMINATE SHEATHED CABLE

[75] Inventors: Terumichi Ichiba; Hiroshi Shimba; Hiroaki Mukunashi, all of Yokohama, Japan

[73] Assignee: Sumitomo Electric Industries, Ltd., Osaka, Japan

[22] Filed: May 14, 1973

[21] Appl. No.: 359,944

[30] Foreign Application Priority Data
May 13, 1972   Japan.............................. 47-47332
May 27, 1972   Japan.............................. 47-52603
May 27, 1972   Japan.............................. 47-52604

[52] U.S. Cl............. 174/102 R; 428/458; 428/461; 428/462; 428/463; 260/80.72
[51] Int. Cl.² ........................ H01B 7/22; B32B 7/00
[58] Field of Search.................... 161/186, 217, 218; 117/132 BE; 260/80.72

[56] References Cited
UNITED STATES PATENTS

| | | | |
|---|---|---|---|
| 3,233,036 | 2/1966 | Jachimowicz.......................... | 117/68 |
| 3,440,199 | 4/1969 | Lindemann et al.............. | 260/80.72 |
| 3,440,200 | 4/1969 | Lindemann et al.............. | 260/80.72 |
| 3,451,950 | 6/1969 | Clarke et al. ........................ | 161/186 |
| 3,525,721 | 8/1970 | Jorgensen ........................ | 260/80.72 |
| 3,639,365 | 2/1972 | Adelman....................... | 260/80.72 |
| 3,639,365 | 2/1972 | Adelman....................... | 117/132 BE |
| 3,723,570 | 3/1973 | Adelman.......................... | 260/80.72 |
| 3,795,540 | 3/1974 | Mildner .............................. | 161/218 |
| 3,826,862 | 7/1974 | Ichiba et al......................... | 428/461 |

*Primary Examiner*—George F. Lesmes
*Assistant Examiner*—William R. Dixon, Jr.
*Attorney, Agent, or Firm*—Sughrue, Rothwell, Mion, Zinn & Macpeak

[57] ABSTRACT

A terpolymer, consisting essentially of (a) a first component of ethylene, (b) a second component selected from an (1) unsaturated glycidyl ester of the following formula (I) and (2) an unsaturated glycidyl ether of the following formula (II), and (c) a third component selected from an alkyl acrylate, an alkyl methacrylate and vinyl acetate, is coated on one or both surfaces of a metal foil to make a laminate tape.

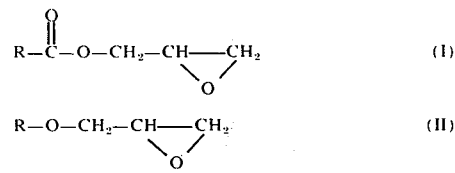

wherein R represents a hydrocarbon residue containing an ethylenically unsaturated bond.

The laminate tape is used for preparing a laminate sheathed cable. The terpolymer resin may contain an antioxidant.

20 Claims, 2 Drawing Figures

LAMINATE TAPE AND LAMINATE SHEATHED CABLE

This application is a companion to copending application Ser. No. 315,965 filed Dec. 18, 1972 and application Ser. No. 360,248 filed May 14, 1973, both of which are directed to a laminate sheathed cable and a laminate tape.

BACKGROUND OF THE INVENTION

1. Field of the Invention

The present invention relates to a laminate tape composed of a metal foil and a terpolymer resin coated on one or both surfaces of the metal foil, as well as to a laminate sheathed cable composed of a cable core and the laminate tape which is used as a masking layer to sheathe the core. More particularly, the invention relates to a laminate tape coated with a terpolymer resin of good adhesive properties not only for the metal foil but also for the polyethylene of a jacket layer, as well as to a laminate sheathed cable formed from said laminate tape.

2. Description of the Prior Art

Resins which are used as a coating layer for preparing laminate sheathed cables must have various characteristics, for example, they must have adhesive property which ensures they adhere not only to a metal foil but also to a jacketing compound, for example, polyethylene, they must be easily workable in the manufacture of a cable, for example, must have abrasion resistance in tape forming apparatus, and the like.

The reason for the necessity of the adhesiveness of the resin to the metal foil and to the polyethylene of the jacket layer is that any contraction of the polyethylene sheath is to be suppressed to improve not only the moisture resistance (that is, the prevention of moisture permeation from the outside) but also the mechanical strength (that is, the bending strength and the like) of the laminated or united sheath (or protective layer). This contraction is primarily because of inner strain generated in the plastic sheath, during the extrusion thereof, and resultant contraction due to the exposure of the polyethylene to the temperature cycle of the outside air.

As resins for forming such laminates, polyethylene has been used (see British Pat. No. 886,417). However, the conventional polyethylene resins are defective in that the adhesive power to an aluminum tape is weak.

In U.S. Pat. No. 3,233,036 a resin containing carboxyl groups is used to improve the adhesive strength to the aluminum tape. However, this prior art is also defective in that sufficient adhesive strength cannot be obtained due to the difference in polarity between the resin and the polyethylene of the protective jacket layer.

Japanese Patent Publication No. 23257/70 discloses a further improvement which is free from the two defects of low adhesive strength and mechanical properties, and provides a laminated tape of the so-called two-layer or multi-layer construction wherein an ethylene copolymer containing a carboxyl group which forms a chemical bond with a metal is coated on the surface which is to contact a metal foil (for example, an aluminum foil) and a resin which does not bind to the metal foil as effectively as the copolymer but which adheres to the jacket layer more firmly than the copolymer is applied to the surface which is not to be in contact with the metal foil.

When this kind of laminate tape is used, although the mechanical properties of the resulting cable are excellent, various faults are encountered in the preparation of laminate tapes, such as the manufacturing steps are complicated, the manufacturing cost is high and the cost of the resulting cables is high. This is because the thus prepared laminate tapes are composed of two layers or multiple layers.

SUMMARY OF THE INVENTION

The object of the present invention is to economically provide a laminate sheathed cable of improved mechanical strength using a resin composition which sufficiently adheres to a metal layer and a protective jacket polyethylene layer. The use of the resin composition results in the elimination of complicated steps in the manufacture of the laminate tape.

The present invention is therefore characterized by the use of a copolymer consisting essentially of an ethylene component which is compatible with the protective polyethylene jacket and other components of the cable and which contains reactive groups of good adhesiveness with a metal.

More particularly, the object of the present invention is to provide a laminate tape and a laminate sheathed cable in which a terpolymer consisting of (a) ethylene, (b) an unsaturated glycidyl ester or an unsaturated glycidyl ether, and (c) an alkyl acrylate, an alkyl methacrylate or vinyl acetate, is used as a coating resin.

Another object of the present invention is to provide a laminate tape and a laminate sheathed cable where a resin of improved heat stability containing 100–10,000 ppm of an antioxidant in addition to the terpolymer component is used.

DETAILED DESCRIPTION OF THE INVENTION

The terpolymers used in the present invention can be prepared according to various methods. One preparation method is to polymerize a mixture of ethylene and other comonomers in the presence of a free radical catalyst under polymerization conditions, e.g., a pressure of 40–5,000 Kg/cm$^2$ and a temperature of 40°–300°C. Another preparation method is to add, in the polymerization step, a chain transfer agent such as ethane, propane, propylene or the like, to prepare the copolymer.

When the resin is used for coating a metal foil, the adhesiveness thereof to the metal foil and the protective polyethylene and the mechanical strength thereof are good, and accordingly, not only is the adhesive strength of the resulting tape improved, but also the workability of the laminate tape in the preparation of a cable is also improved.

Figure 1:
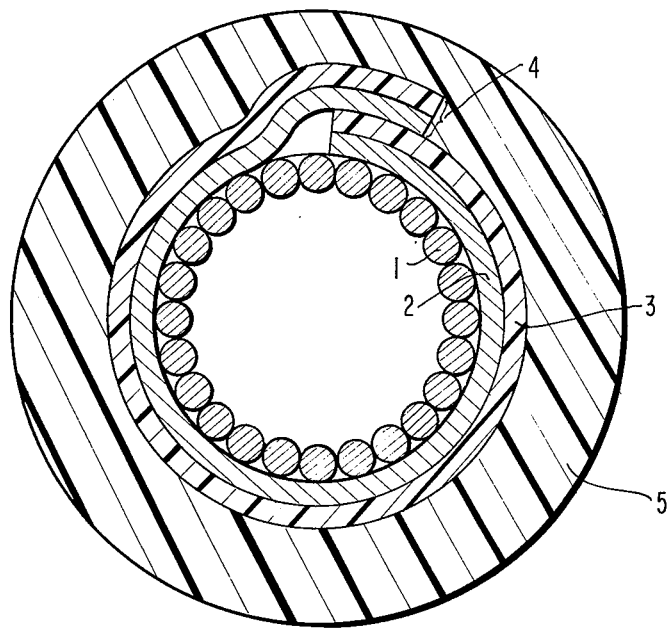
FIG. 1 shows a cross-cut section of a known laminate sheathed cable where a laminate foil of a metal tape and a resin coated on one surface thereof is used.

With reference to FIG. 1 which shows a cross-cut section of a known laminate sheathed cable where a laminate tape consisting of a metal foil and a resin coated on one surface of the metal is used, 1 is a cable core 4, is a laminate tape layer (consisting of a metal foil 2 and a resin layer 3 laminated on the foil 2), and 5 is a jacket layer of a synthetic resin.

The effect of the resin compositions used in the present invention will now be further clarified by means of various examples. In general, an aluminum foil is used as the metal layer of a laminate sheathed cable, and in the following examples and comparative examples aluminum was used as the metal foil layer.

The components of the terpolymers shown in Table 1 are as follows (% by weight):

| grade | GMA | GA | AGE | MA | EA | MMA | EMA | ethylene | VA |
|---|---|---|---|---|---|---|---|---|---|
| $G_1$ | 2.4 | — | — | 8 | — | — | — | balance | — |
| $G_2$ | 6.0 | — | — | 6 | — | — | — | " | — |
| $G_3$ | 12.0 | — | — | 4 | — | — | — | " | — |
| $G_4$ | 6.0 | — | — | — | — | 8 | — | " | — |
| $G_5$ | — | 2.5 | — | — | 10 | — | — | " | — |
| $G_6$ | — | 6.0 | — | — | .6 | — | — | " | — |
| $G_7$ | — | 10.0 | — | — | 4 | — | — | " | — |
| $G_8$ | — | 6.5 | — | — | — | — | 5 | " | — |
| $G_9$ | — | — | 3.5 | 10 | — | — | — | " | — |
| $G_{10}$ | — | — | 6.5 | 3 | — | — | — | " | — |
| $G_{11}$ | — | — | 12.0 | 2 | — | — | — | " | — |
| $G_{12}$ | — | — | 5.0 | — | — | 6 | — | " | — |
| $V_1$ | — | 2.5 | — | — | — | — | — | " | 8 |
| $V_2$ | — | 2.5 | — | — | — | — | — | " | 6 |
| $V_3$ | — | 6.0 | — | — | — | — | — | " | 4 |
| $V_4$ | — | 12.0 | — | — | — | — | — | " | 2 |
| $V_5$ | — | — | 2.0 | — | — | — | — | " | 8 |
| $V_6$ | — | — | 6 | — | — | — | — | " | 8 |
| $V_7$ | — | — | 10.0 | — | — | — | — | " | 4 |
| $V_8$ | — | — | 12.5 | — | — | — | — | " | 2 |

GMA: glycidyl methacrylate
GA : glycidyl acrylate
AGE: allyl glycidyl ether
MA : methyl acrylate
EA : ethyl acrylate
MMA: methyl methacrylate
EMA: ethyl methacrylate
VA : vinyl acetate The resins of Table 1 are as follows:

| | | |
|---|---|---|
| $E_1 - E_2$ | : | ethylene-vinyl acetate copolymers |
| $A_1 - A_2$ | : | ethylene-acrylate copolymers |
| S | : | copolymer of ethylene and a comonomer containing a carboxyl group |
| P | : | polyethylene |
| $G_1 - G_3$ | : | ethylene-glycidyl methacrylate-methyl acrylate terpolymers |
| $G_4$ | : | ethylene-glycidyl methacrylate-methyl methacrylate terpolymer |
| $G_5 - G_7$ | : | ethylene-glycidyl acrylate-ethyl acrylate terpolymer |
| $G_8$ | : | ethylene-glycidyl acrylate-ethyl methacrylate terpolymer |
| $G_9 - G_{11}$ | : | ethylene-allyl glycidyl ether-methyl acrylate terpolymer |
| $G_{12}$ | : | ethylene-allyl glycidyl ether-methyl methacrylate terpolymer |
| $V_1 - V_4$ | : | ethylene-glycidyl acrylate-vinyl acetate terpolymer |
| $V_5 - V_8$ | : | ethylene-allyl glycidyl ether-vinyl acetate terpolymer |

TABLE 1

| Resin | Melt Index (g/10 min) ASTM 1238 | Basic Characteristics of Resins Tensile Strength (Kg/cm$^2$) JIS-K-6760 | Elongation (%) JIS-K-6760 | Coefficient of Static Friction (against surface of copper) |
|---|---|---|---|---|
| $E_1$ | 12.4 | 1.48 | 550 | 0.50 |
| $E_2$ | 2.8 | 1.80 | 614 | 0.45 |
| $A_1$ | 5.7 | 1.62 | 768 | 0.70 |
| $A_2$ | 1.7 | 2.59 | 763 | 0.68 |
| S | 3.5 | 2.92 | 478 | 0.56 |
| P | 7.2 | 1.27 | 512 | 0.40 |
| $G_1$ | 2.0 | 1.69 | 610 | 0.45 |
| $G_2$ | 2.0 | 1.72 | 605 | 0.48 |
| $G_3$ | 12.0 | 1.55 | 572 | 0.56 |
| $G_4$ | 8.0 | 1.62 | 598 | 0.50 |
| $G_5$ | 2.0 | 1.73 | 635 | 0.48 |
| $G_6$ | 2.0 | 1.70 | 645 | 0.48 |
| $G_7$ | 5.0 | 1.58 | 602 | 0.51 |
| $G_8$ | 3.0 | 1.68 | 612 | 0.49 |
| $G_9$ | 2.0 | 1.74 | 659 | 0.46 |
| $G_{10}$ | 2.0 | 1.68 | 630 | 0.48 |
| $G_{11}$ | 3.0 | 1.58 | 610 | 0.50 |
| $G_{12}$ | 2.0 | 1.65 | 597 | 0.50 |
| $V_1$ | 2.0 | 1.69 | 610 | 0.48 |
| $V_2$ | 2.0 | 1.74 | 642 | 0.46 |
| $V_3$ | 2.0 | 1.70 | 624 | 0.45 |
| $V_4$ | 5.0 | 1.61 | 587 | 0.51 |
| $V_5$ | 2.0 | 1.75 | 619 | 0.46 |
| $V_6$ | 3.0 | 1.67 | 621 | 0.45 |
| $V_7$ | 3.0 | 1.59 | 574 | 0.47 |
| $V_8$ | 6.0 | 1.59 | 577 | 0.48 |

TABLE 2

| Resin | Adhesive Property and Other Properties of Resins | | | | | |
|---|---|---|---|---|---|---|
| | Adhesive Strength Between Aluminum Foil and Laminating Resin (g/cm) | | Adhesive Strength Between Laminating Resin and Polyethylene (Kg/cm) sheet method *(3) | Workability of Cable *(4) | Blocking of Laminate Tape *(5) | Adhesive Strength Between Aluminum Foil and Laminating Resin (g/cm) high-temperature laminate method *(6) |
| | sheet method *(1) | laminate method *(2) | | | | |
| $E_1$ | 341 | 341 | 4 or more | bad | occurred | — |
| $E_2$ | 394 | 320 | " | good | did not occur | — |
| $A_1$ | 1613 | 433 | " | bad | occurred | — |
| $A_2$ | 1068 | 421 | " | " | " | — |
| S | 1559 | 1055 | 0 | good | did not occur | — |
| P | 159 | 50 | 5.5 | " | " | — |
| $G_1$ | 2000 or more | 600 or more | 4 or more | " | " | 419 |
| $G_2$ | " | " | " | " | " | 423 |
| $G_3$ | " | " | " | " | " | 339 |
| $G_4$ | " | " | " | " | " | 411 |
| $G_5$ | " | " | " | " | " | 429 |
| $G_6$ | " | " | " | " | " | 441 |
| $G_7$ | " | " | " | " | " | 402 |
| $G_8$ | " | " | " | " | " | 452 |
| $G_9$ | " | " | " | " | " | 433 |
| $G_{10}$ | " | " | " | " | " | 408 |
| $G_{11}$ | " | " | " | " | " | 394 |
| $G_{12}$ | " | " | " | " | " | 447 |
| $V_1$ | " | " | " | " | " | 421 |
| $V_2$ | " | " | " | " | " | 438 |
| $V_3$ | " | " | " | " | " | 437 |
| $V_4$ | " | " | " | " | " | 445 |
| $V_5$ | " | " | " | " | " | 430 |
| $V_6$ | " | " | " | " | " | 427 |
| $V_7$ | " | " | " | " | " | 440 |
| $V_8$ | " | " | " | " | " | 444 |
| two-layer type tape *(7) | — | 520 | — | " | " | — |

— not tested

Figure 2:
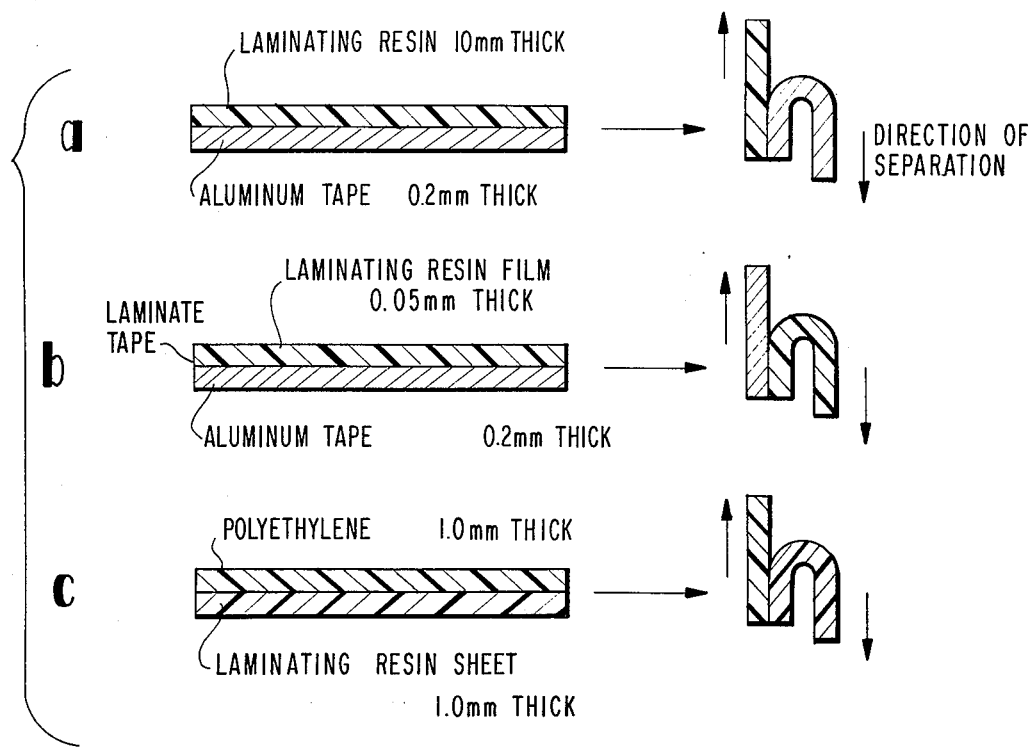
FIG. 2 shows testing methods of the adhesive strength of laminate tapes.

Remarks:

*(1) A soft aluminum (thickness: 0.2 mm) and a resin sheet (thickness: 1.0 mm) were adhered together under heat (180°C) and pressure and then cooled to room temperature. The method of testing the adhesive strength is shown in FIG. 2, (a).

*(2) A resin (thickness: 0.05 mm) was laminated on a soft aluminum (thickness: 0.2 mm) by extrusion. The extrusion temperature was 230°C and the lamination speed was 10 m/min. The method of testing the adhesive strength is shown in FIG. 2, (b).

*(3) A protective polyethylene (low density polyethylene, 1.0 mm thick) and a resin sheet (thickness: 1.0 mm) were adhered together under heat (160°C) and pressure, and then cooled to room temperature. The method of testing the adhesive strength is shown in FIG. 2, (c).

*(4) In the preparation of cable, the surface of the resin film is abraded and develops many fine splits. The susceptibility to abrasion and the generation of fine splits depends upon the mechanical properties of the resin as well as upon the kind of comonomers and the content thereof.

*(5) Blocking occurs in the laminate tape rolled in the form of a coil during the storage thereof. Blocking depends upon the kind of comonomer and the content thereof as well as the melt index of the resin.

*(6) A resin (thickness: 0.05 mm) was laminated on a soft aluminum (thickness: 0.2 mm) by extrusion. The extrusion temperature was 265°C or greater, and the lamination speed was 10 m/min. The method of testing the adhesive strength is shown in FIG. 2, (b).

*(7) This is a laminate tape manufactured by the method described in Japanese Patent Publication No. 23257/70.

As is apparent in Tables 1 and 2, the adhesive strength of the ethylene-vinyl acetate copolymers ($E_1$, $E_2$) is weak, particularly to the aluminum foil. With respect to the ethylene-acrylate copolymers ($A_1$, $A_2$), the adhesive strength thereof is strong, but the workability in cable manufacture and the blocking property of the laminate tape are bad.

When polyethylene (P) is used as the laminating resin, the adhesive strength to the aluminum tape is weak, and when the resin containing a carboxyl group (S) is used, the adhesive strength to the polyethylene jacket layer is weak.

Accordingly, these resins ($E_1$, $E_2$, $A_1$, $A_2$, P, S) are unsuitable in using as materials for laminates.

In the above examples and comparative examples, it was substantiated that the ternary copolymers of the present invention consisting of (a) ethylene, (b) an unsaturated glycidyl ester or an unsaturated glycidyl ether and (c) an alkyl acrylate, an alkyl methacrylate or vinyl acetate are excellent in every point, that is, in adhesiveness to the aluminum foil and to the polyethylene of the jacket layer and in their workability in the formation of cables, as compared to conventional resins.

The above examples show some embodiments of the present invention using the terpolymers of this invention. According to studies of the inventors, it was further found that when the total concentration of the comonomer components except ethylene exceeds about 25% by weight, and when the melt index exceeds about 15, it becomes difficult to form a laminate tape around a cable core.

As shown in Table 2, the terpolymers of the present invention are excellent in adhesive strength to the aluminum foil when the laminate tapes are formed by means of a press-sheet method — *(1) — or by means of an extrusion-laminate method under the laminating conditions of 230°C and 10 m/min. However, the properties of the laminate tapes of the present invention prepared by means of a high-temperature extrusion-laminate method — *(6) — where an extruder is used under the extrusion-lamination conditions of a temperature of 265°C or more are not so different from those of conventional laminate tapes, and, in particular, the adhesive strength of the high-temperature extrusion laminate tapes is inferior to that of the laminate tapes prepared at a temperature of 230°C.

Observing the thickness of the laminated resin layer, the inventors found that there was at most a 10% thickness fluctuation in the tapes prepared by extrusion at 230°C and that there was about a 28% thickness fluctuation in those at 265°C.

The inventors prepared various extrusion-laminate tapes under high extrusion temperatures to try to improve the adhesive strength between the aluminum foil and the resin layer, to increase the lamination speed and to make the thickness of the resin layer uniform, and at last the inventors succeeded in the preparation of such improved laminate tapes under the high-temperature extrusion-condition.

More precisely, the preparation of the improved laminate tapes was attained by adding 100–10,000 ppm of an antioxidant into the above described terpolymer of the present invention. The effective results due to the addition are shown in Table 3. The effects are excellent and cannot be attained with conventional laminating materials, as is shown in following Table 3.

The inventors actually tested various kinds of antioxidants as shown in Table 4, and in Table 3 the results of some typical ones are shown. In general, any antioxidants desclosed in Table 4 have the same effects as those in Table 3. In addition, the workability into cables and the blocking property of the laminate tape were also tested with the combination of the terpolymer of the present invention and the antioxidant, and it was substantiated that the properties were also good, as in the case where the antioxidant was not present.

With respect to the content of the antioxidant, the heat stability effect can be attained in the resulting tape when the antioxidant is present in an amount of 100 ppm or more, and, more preferably, the effect is more remarkable when the amount is 300 ppm or more. Related tests were conducted with up to 10,000 ppm of antioxidant, and the same effects were confirmed.

However, it was found that if the content of the antioxidant is increased too much, the antioxidant undesireably migrates to the surface of the tape. Accordingly, the preferred antioxidant content range is 300–5,000 ppm.

Due to the addition of the antioxidant, the lamination speed can be extremely increased, and the thickness fluctuation of the resin layer formed decreased to about 10%.

TABLE 3

| Resin | Adhesive Strength of Resin Containing Antioxidant | | |
|---|---|---|---|
| | Antioxidant | Amount of Antioxidant (ppm) | Adhesive Strength Between Aluminum Foil and resin (g/cm) laminate method *(2) |
| $E_1$ | Antigen WX | 1000 | 355 |
| $E_2$ | " | " | 334 |
| $A_1$ | " | " | 460 |
| $A_2$ | " | " | 430 |
| S | " | " | 1026 |
| P | " | " | 55 |
| $G_1$ | " | 100 | 499 |
| " | " | 300 | 578 |
| " | " | 1000 | 700 or more |
| " | " | 5000 | " |
| " | " | 10000 | " |
| " | Irganox 1010 | 100 | 522 |
| " | " | 300 | 592 |
| " | " | 1000 | 700 or more |
| " | " | 5000 | " |
| " | " | 10000 | " |
| $G_4$ | Antigen WX | 300 | 576 |
| " | " | 1000 | 700 or more |
| " | " | 5000 | " |
| " | Irganox 1010 | 300 | 560 |
| " | " | 1000 | 700 or more |
| " | " | 5000 | " |
| $G_5$ | Antigen WX | 300 | 610 |
| " | " | 1000 | 700 or more |
| " | " | 5000 | " |
| " | Irganox 1010 | 300 | 545 |
| " | " | 1000 | 700 or more |
| " | " | 5000 | " |
| $G_8$ | Antigen WX | 300 | 583 |
| " | " | 1000 | 700 or more |
| " | " | 5000 | " |
| " | Irganox 1010 | 300 | 565 |
| " | " | 1000 | 698 |
| " | " | 5000 | 700 or more |
| $G_9$ | Antigen WX | 300 | 551 |
| " | " | 1000 | 700 or more |
| " | " | 5000 | " |
| " | Irganox 1010 | 300 | 573 |
| " | " | 1000 | 682 |
| " | " | 5000 | 700 or more |
| $G_{12}$ | Antigen WX | 300 | 584 |
| " | " | 1000 | 700 or more |
| " | " | 5000 | " |
| " | Irganox 1010 | 300 | 549 |

TABLE 3-continued

Adhesive Strength of Resin Containing Antioxidant

| Resin | Antioxidant | Amount of Antioxidant (ppm) | Adhesive Strength Between Aluminum Foil and resin (g/cm) laminate method *(2) |
|---|---|---|---|
| '' | '' | 1000 | 700 or more |
| '' | '' | 5000 | '' |
| $V_1$ | Antigen WX | 100 | 489 |
| '' | '' | 300 | 578 |
| '' | '' | 1000 | 600 or more |
| '' | '' | 5000 | '' |
| '' | '' | 10000 | '' |
| '' | Irganox 1010 | 100 | 502 |
| '' | '' | 300 | 595 |
| '' | '' | 1000 | 600 or more |
| '' | '' | 5000 | '' |
| '' | '' | 10000 | '' |
| $V_3$ | Antigen WX | 300 | 573 |
| '' | '' | 1000 | 600 or more |
| '' | '' | 5000 | '' |
| '' | Irganox 1010 | 300 | 556 |
| '' | '' | 1000 | 600 or more |
| '' | '' | 5000 | '' |
| $V_5$ | Antigen WX | 100 | 481 |
| '' | '' | 300 | 543 |
| '' | '' | 1000 | 594 |
| '' | '' | 5000 | 600 or more |
| '' | Irganox 1010 | 100 | 479 |
| '' | '' | 300 | 567 |
| '' | '' | 1000 | 600 or more |
| '' | '' | 5000 | '' |
| $V_7$ | Antigen WX | 300 | 532 |
| '' | '' | 1000 | 600 or more |
| '' | '' | 5000 | '' |
| '' | Irganox 1010 | 300 | 552 |
| '' | '' | 1000 | 600 or more |
| '' | '' | 5000 | '' |

TABLE 4

Antioxidant Used

| No. | Antioxidant chemical name | trade name |
|---|---|---|
| 1 | 4,4'-thiobis-(6-tert.butyl-3-methylphenol) | Antigen WX |
| 2 | 4,4'-butylidene-bis-(6-tert.butyl-3-cresol) | Samilizer BBM |
| 3 | high molecular weight phenol type | Topanol CA |
| 4 | mercaptobenzimidazole | Antigen MB |
| 5 | zinc salt of 2-mercaptobenzthiazole | Soxinol MZ |
| 6 | seleniumdiethyldithiocarbamate | Soxinol SE |
| 7 | polymer of 2,2,4-trimethyl-1,2-dihydro-quinoline | Antigen RD |
| 8 | reaction product of 1,1-bis(4-hydroxyphenyl)-cyclohexane and organic amine | Antigen WA |
| 9 | N,N'-di-beta-naphthyl-p-phenylenediamine | Antigen F |
| 10 | phenyl-alpha-naphthylamine | Antigen PA |
| 11 | phenyl-beta-naphthylamine | Antigen D |
| 12 | triazine derivative | Irganox 565 |
| 13 | triazine derivative | Irganox 858 |
| 14 | high molecular weight hindered phenol | Irganox 1010 |
| 15 | high molecular weight hindered phenol | Irganox 1076 |

The bending strength of the cable and the adhesive strength between the aluminum foil and the polyethylene jacket layer via the laminating resin are shown in Tables 5 and 6, where some typical resins as shown in Table 1 were used as the laminating resin. Table 5 gives the results for embodiments containing an antioxidant and the Table 6 gives the results for embodiments which do not contain an antioxidant.

The cable used for this experiment has the structure as shown in FIG. 1 (No. 26 AWG, 100 pairs, aerial cable of 0.4 mm diameter).

TABLE 5

| | | Properties of Cable (with antioxidant) | | |
|---|---|---|---|---|
| Resin | Antioxidant | Amount of Antioxidant (ppm) | Adhesive Strength Between Aluminum Foil and Jacket Layer (Kg/cm) | Bending Repetition (up to Formation of Cracks in Aluminum) |
| P | Antigen WX | 3000 | 0.95 | 10–15 |
| S | '' | '' | 1.55 | 20–25 |
| $E_1$ | '' | '' | 1.65 | 20–25 |
| $G_1$ | '' | '' | 3.24 | 35–40 |
| '' | Irganox 1010 | '' | 3.52 | 35–40 |
| $G_4$ | Antigen WX | '' | 3.19 | 35–40 |
| '' | Irganox 1010 | '' | 3.42 | 35–40 |
| $G_5$ | Antigen WX | '' | 3.33 | 30–35 |
| '' | Irganox 1010 | '' | 2.97 | 30–35 |
| $G_8$ | Antigen WX | '' | 3.46 | 30–35 |
| '' | Irganox 1010 | '' | 3.09 | 30–35 |
| $G_9$ | Antigen WX | '' | 3.14 | 35–40 |

TABLE 5-continued

| Resin | Properties of Cable (with antioxidant) | | |
|---|---|---|---|
| | Amount of Antioxidant (ppm) | Adhesive Strength Between Aluminum Foil and Jacket Layer (Kg/cm) | Bending Repetition (up to Formation of Cracks in Aluminum) |
| " | Irganox 1010 | 3.38 | 35–40 |
| $V_1$ | Antigen WX | 3.42 | 35–40 |
| " | Irganox 1010 | 3.35 | 35–40 |
| $V_7$ | Antigen WX | 3.29 | 35–40 |
| " | Irganox 1010 | 3.32 | 34–40 |
| two-layer type tape | — | 3.05 | 30–35 |

TABLE 6

| Resin | Properties of Cable (without antioxidant) | |
|---|---|---|
| | Adhesive Strength Between Aluminum Foil and Jacket Layer (Kg/cm) | Bending Repetition (up to formation of cracks in aluminum) |
| P | 0.98 | 10–15 |
| S | 1.66 | 20–25 |
| $E_1$ | 1.73 | 20–25 |
| $G_1$ | 1.54 | 20–25 |
| $G_4$ | 1.68 | 20–25 |
| $G_5$ | 1.83 | 20–25 |
| $G_8$ | 1.72 | 20–25 |
| $G_9$ | 1.70 | 20–25 |
| $G_{12}$ | 1.59 | 20–25 |
| $V_1$ | 1.62 | 20–25 |
| $V_3$ | 1.71 | 20–25 |
| $V_5$ | 1.58 | 20–25 |
| $V_7$ | 1.78 | 20–25 |

Remarks:
1) The resin used and the method of testing the adhesive strength were the same as in Table 2.
2) Bending Test: The bending strength was tested according to the mandrel test method where a mandrel of a diameter 12 times of that of the cable tested was used and bending to a straight angle was repeated. One repeated bending is counted as one time, and the number of such bendings are given in Tables 5 and 6.

As is seen in Tables 5 and 6, the cables of the present invention have excellent properties similar to those of a cable formed with a two-layer type tape. From such results, it is apparent that the cables of the present invention are excellent from the view-point of mechanical strength and are economical.

While the invention has been described in detail and with reference to specific embodiments thereof, it will be apparent to one skilled in the art that various changes and modifications can be made therein without departing from the spirit and scope thereof.

What is claimed is:

1. A laminate sheathed cable including a laminate tape composed of a metal foil and a terpolymer resin coated on one or both surfaces of the metal foil, the terpolymer resin having a metal index of below about 15 and consisting of (a) a first component of at least 25 weight percent ethylene; (b) a second component selected from glycidyl methacrylate, glycidyl acrylate and allyl glycidyl ether; and (c) a third component selected from an alkyl acrylate and an alkyl methacrylate, said laminate tape being formed on a cable core in the form of a tube such that both ends of the laminated tape are united.

2. A laminate sheathed cable as claimed in claim 1, wherein said terpolymer resin consists of (a) at least 25 weight percent ethylene; (b) glycidyl methacrylate; and (c) methyl acrylate.

3. A laminate sheathed cable as claimed in claim 1, wherein said terpolymer resin consists of (a) at least 25 weight percent ethylene; (b) glycidyl methacrylate; and (c) methyl methacrylate.

4. A laminate sheathed cable as claimed in claim 1, wherein said terpolymer resin consists of (a) at least 25 weight percent ethylene; (b) glycidyl acrylate; and (c) ethyl acrylate.

5. A laminate sheated cable as claimed in claim 1, wherein said terpolymer resin consists of (a) at least 25 weight percent ethylene; (b) glycidyl acrylate; and (c) ethyl methacrylate.

6. A laminate sheathed cable as claimed in claim 1, wherein said terpolymer resin consists of (a) at least 25 weight percent ethylene; (b) allyl glycidyl ether; and (c) methyl acrylate.

7. A laminate sheathed cable as claimed in claim 1, wherein said terpolymer resin consists of (a) at least 25 weight percent ethylene; (b) allyl glycidyl ether; and (c) methyl methacrylate.

8. A laminate sheathed cable as claimed in claim 2, wherein said terpolymer resin consists of (a) at least 25 weight percent ethylene; (b) allyl glycidyl ether; and (c) vinyl acetate.

9. A laminate sheated cable as claimed in claim 1 wherein an antioxidant is added to the terpolymer resin in an amount of 100–10,000 ppm on said basis of the resin in the preparation of the laminate tape.

10. A laminate sheathed cable including a laminate tape composed of a metal foil and a terpolymer resin coated on one or both surfaces of the metal foil, the terpolymer resin having a melt index of below about 15 and consisting of (a) a first component of at least 25 weight percent ethylene; (b) a second component selected from glycidyl acrylate and allyl glycidyl ether; and (c) a third component of vinyl acetate, said laminate tape being formed on a cable core in the form of a tube such that both ends of the laminated tape are united.

11. A laminate tape of a resin and a metal foil adapted to be formed on a cable core in the form of a tube, both ends of said laminate tape capable of being united, characterized in that a terpolymer resin having a melt index below about 15 and consisting of (a) a first component of at least 25 weight percent ethylene; (b) a second component selected from glycidyl methacrylate, glycidyl acrylate and allyl glycidyl ether; and (c) a third component selected from an alkyl acrylate and an alkyl methacrylate, is used as the resin, said resin being coated on one or both surfaces of the metal foil.

12. A laminate tape as claimed in claim 11 wherein an antioxidant is added to said terpolymer resin in an amount of 100–10,000 ppm, on the basis of the resin.

13. A laminate tape as claimed in claim 11, wherein said terpolymer resin consists of (a) at least 25 weight percent ethylene; (b) glycidyl methacrylate; and (c) methyl acrylate.

14. A laminate tape as claimed in claim 11, wherein said terpolymer resin consists of (a) at least 25 weight percent ethylene; (b) glycidyl methacrylate; and (c) methyl methacrylate.

15. A laminate tape as claimed in claim 11, wherein said terpolymer resin consists of (a) at least 25 weight percent ethylene; (b) glycidyl acrylate; and (c) ethyl acrylate.

16. A laminate tape as claimed in claim 11, wherein said terpolymer resin consists of (a) at least 25 weight percent ethylene; (b) glycidyl acrylate; and (c) ethyl methacrylate.

17. A laminate tape as claimed in claim 11, wherein said terpolymer resin consists of (a) at least 25 weight percent ethylene; (b) allyl glycidyl ether; and (c) methyl acrylate.

18. A laminate tape as claimed in claim 11, wherein said terpolymer resin consists of (a) at least 25 weight percent ethylene; (b) allyl glycidyl ether; and (c) methyl methacrylate.

19. A laminate tape as claimed in claim 13, wherein said terpolymer resin consists of (a) at least 25 weight percent ethylene; (b) allyl glycidyl ether; and (c) vinyl acetate.

20. A laminate tape of a resin and a metal foil adapted to be formed on a cable core in the form of a tube, both ends of said laminate tape capable of being united, characterized in that a terpolymer resin having a melt index below about 15 and consisting of (a) a first component of at least 25 weight percent ethylene; (b) a second component selected from glycidyl acrylate and allyl glycidyl ether; and (c) a third component of vinyl acetate, is used as the resin, said resin being coated on one or both surfaces of the metal foil.

* * * * *